United States Patent
Øien et al.

(10) Patent No.: US 7,563,419 B2
(45) Date of Patent: Jul. 21, 2009

(54) METHOD AND DEVICE FOR SUPPORTING CATALYST GAUZES IN AN AMMONIA OXIDATION BURNER

(75) Inventors: Halvor Øien, Porsgrunn (NO); Leif Grønstad, Sannisdal (NO); Øystein Nirisen, Brevik (NO); Per Ivar Karlsen, Langangen (NO); Magne Slåen, Skien (NO)

(73) Assignee: Yara International ASA, Oslo (NO)

( * ) Notice: Subject to any disclaimer, the term of this patent is extended or adjusted under 35 U.S.C. 154(b) by 329 days.

(21) Appl. No.: 10/519,072

(22) PCT Filed: Sep. 20, 2002

(86) PCT No.: PCT/NO02/00332

§ 371 (c)(1),
(2), (4) Date: Sep. 13, 2005

(87) PCT Pub. No.: WO2004/005187

PCT Pub. Date: Jan. 15, 2004

(65) Prior Publication Data

US 2006/0110302 A1    May 25, 2006

(30) Foreign Application Priority Data

Jul. 3, 2002    (NO) .................................. 20023235

(51) Int. Cl.
*B01J 8/44*   (2006.01)
*B01J 8/08*   (2006.01)
*B01J 35/02*  (2006.01)
*B01J 19/00*  (2006.01)
*B01J 23/90*  (2006.01)
*B01J 19/18*  (2006.01)

(52) U.S. Cl. .................... 422/311; 422/211; 422/220; 422/221; 422/228; 422/239

(58) Field of Classification Search ................. 422/211, 422/311, 239, 220, 228, 221
See application file for complete search history.

(56) References Cited

U.S. PATENT DOCUMENTS 2,745,722 A * 5/1956 Lacoste ...................... 422/219

(Continued)

FOREIGN PATENT DOCUMENTS

DE    2754643    6/1979

(Continued)

OTHER PUBLICATIONS

M.M. Karavaev et al, "Catalytic ammonia oxidation", Moscow, Chemistry, 1983, pp. 122-137.*

(Continued)

*Primary Examiner*—Walter D Griffin
*Assistant Examiner*—Natasha Young
(74) *Attorney, Agent, or Firm*—Wenderoth, Lind & Ponack, L.L.P.

(57) ABSTRACT

A support system for catalyst gauzes in an ammonia oxidation burner and a method of reducing movement of particulate ceramic material due to thermal dilatation includes the catalyst gauzes (1) and possibly support screens (2) being supported by ceramic fillings contained in a burner basket with metal walls and a perforated bottom plate. A "wave breaker" (9, 11) is fixed to the metal wall (4) and/or the outer part/periphery of the bottom plate (5).

19 Claims, 2 Drawing Sheets

U.S. PATENT DOCUMENTS 5,882,385 A * 3/1999 Bosquain et al. .............. 96/138

FOREIGN PATENT DOCUMENTS

| GB | 2274071 | 7/1994 |
| SU | 1678425 | 9/1991 |
| WO | 8603479 | 6/1986 |
| WO | 9108982 | 6/1991 |
| WO | WO 98/28073 * | 7/1998 |
| WO | 98/57887 | 12/1998 |
| WO | 00/40329 | 7/2000 |
| WO | WO 03/000400 A1 * | 1/2003 |

OTHER PUBLICATIONS

M.M. Karavaev et al. "Catalytic ammonia oxidation", Moscow, Chemistry, 1983, p. 134.

* cited by examiner

METHOD AND DEVICE FOR SUPPORTING CATALYST GAUZES IN AN AMMONIA OXIDATION BURNER

BACKGROUND OF THE INVENTION

In a conventional ammonia oxidation burner a mixture of $NH_3$, $O_2$ and $N_2$ react at an elevated temperature and pressure over a platinum metal catalyst to nitrogen oxides. Volatilised platinum is collected by a catchment material. Typically, both the catalyst and catchment material comprise a woven or knitted gauze and accordingly several such gauzes made into a pack secured to the burner structure by clamping means. The catalyst/catchment pack is placed on a support in the burner. The most commonly used type of support is ceramic rings, Raschig rings, placed in a basket secured to the burner structure. Usually a support gauze of woven or knitted non precious metal, for instance "Megapyr", is placed between the main support and the catalyst/catchment pack. Such conventional burners are further described in Ullmanns Encyclopaedia, Vol. 20, pages 314-317, 4th Ed. If a $N_2O$ decomposition catalyst is used in the burner, this will replace all or a part of the support material.

The ceramic rings and possible ceramic catalyst material often move away from the periphery during operation due to thermal dilatation. This movement creates a trough which often causes the gauze pack to tear. Especially around the outer edge of the gauzes the damage might be severe due to the lowered level of the Raschig rings there. It is a common observation that the trough deepens with the number of starts and stops in the plant. This tearing represents a problem both due to loss of combustion efficiency, reduced cycle time and also a hazard problem. The ammonia slipping may form ammonium nitrate and ammonium nitrite in the downstream equipment, especially in the acid condenser. Ammonium nitrate and nitrite may decompose violently.

SUMMARY OF THE INVENTION

The object of the invention is to arrive at a support structure that would not cause damage to the catalyst pack during operation of the burner. Another object is to arrive at a system that prevents or reduces movement of particulate ceramic material during operation.

These and other objects of the invention are obtained with the method and support system as described below. The invention is further characterized by the patent claims.

BRIEF DESCRIPTION OF THE DRAWINGS

The invention will be described with reference to the drawings, FIGS. 1-2 where.

DETAILED DESCRIPTION OF PREFERRED EMBODIMENTS

The invention thus concerns a method and a support system for reducing movement of particulate ceramic material and avoiding tearing of catalyst gauzes in an ammonia oxidation burner. The catalyst gauzes and possibly support screens are being supported by ceramic fillings and possible catalyst material contained in a burner basket with metal walls and perforated bottom plate. A "wave breaker" is preferably fixed to the metal wall of the burner basket or alternatively to the periphery of the bottom plate of the burner basket. The ceramic fillings will then move along with the metal wall during expansion. It is preferred that the "wave breaker" is perforated and filled with ceramic fillings or similar material to obtain the same flow resistance as the filling material of the bed. The "wave breaker" could be in the form of a triangular shaped ridge. It could be a right-angled triangle with the right angled wall fixed to the metal wall, or an equilateral triangle fixed to the periphery of the bottom plate. The "wave breaker" could also be a smooth or perforated sheet arranged at an angle of 10-60° to the wall. A preferred angle is 25-35°. The ridge or sheet could be made of segments and the segments could have an end wall. It is also possible to use a "wave breaker" in the form of a honeycomb structure, preferably with a sloping top.

Initial tests in small scale indicated that an important factor for the formation of the trough is the difference in expansion of the Raschig rings and metal support due to temperature variation. After only a few cycles of expansion without any support systems in the bed a trough was created, and part of the outer edge became empty of rings. This is similar to observations from burners which have been in operation. The cause of the trough formation is believed to be the difference in thermal expansion in the metal of the burner basket and the ceramic Raschig rings. In the larger plants with up to 5 m in burner diameter, the thermal expansion of the metal basket are up to 30 mm on the radius, caused by heating from ambient to operation temperature.

Figure 1:
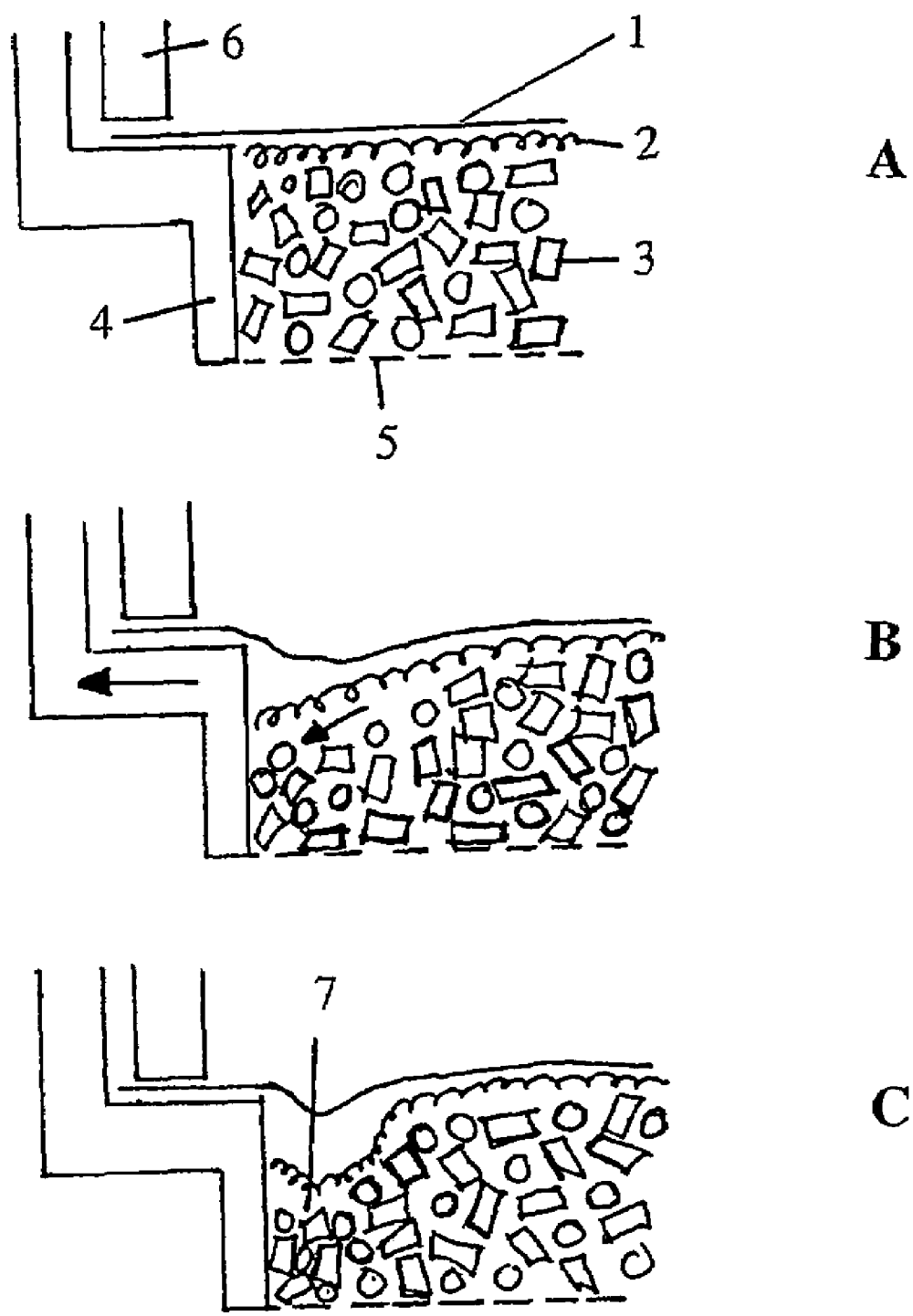
FIG. 1 shows the formation of a trough in the ceramic fillings contained in a burner basket.

In FIG. 1 the effect of the heat variations is illustrated. FIG. 1A shows schematically the equipment before start. The ammonia oxidation burner comprises a catalyst layer, usually in the form of a plurality of woven or knitted gauzes of Pt/Rh wire and normally a catchment layer of getter material, for instance a palladium alloy in the form of woven or knitted gauzes. All these gauzes form a pack 1 resting on a steel screen 2 supported by a layer of Raschig rings 3 placed in a basket with metal wall 4 and perforated bottom plate 5. Some or all of the Raschig rings may be replaced by a ceramic catalyst. The catalyst pack, the catchment pack and the support gauze are secured to the circumference of the burner on a ledge by fixing weights 6 or similar arrangement. The basket is also secured to the burner wall at about the same place. Before start the Raschig rings bed is leveled, and the steel screen and the catalyst gauze pack are installed and fixed around the periphery.

After the first start, the metal wall and perforated bottom plate expands more than the Raschig rings. This means that the Raschig rings will not expand and fill the gap after the metal wall has moved outwards. This situation is illustrated in FIG. 1B.

When the plant shuts down the metal wall cools and contracts, and the Raschig rings at the periphery are pushed inwards with respect to their original position. FIG. 1C shows a vertical section view of a conventional catalyst and catchment gauze pack and its support at the end of a campaign. Here a trough 7 is formed which often causes the gauzes to tear. This tearing represents a problem both due to loss of combustion efficiency, reduced campaign length and also a hazard problem.

It is the rings close to the periphery that move. To overcome this problem it was suggested to install a support structure, also called "wave breaker", in the bed to prevent the creation of a trough. Based on the initial experiments a test unit was constructed with dimensions as one part from centre to periphery of an average burner. To simulate temperature expansion, hydraulic force was installed to be able to move one of the short walls. The pilot test will not be able to reproduce the expansion over the whole radius of the burner, but can reproduce the net effect at one end of the compartment. The number of expansions of a burner in operation are dependent on the number of shut downs during one campaign, and this number varies between 1 and 10.

The first step was to recreate the phenomenon with the trough which is formed at the periphery of the Raschig ring bed during operation. This point was of importance to see whether the temperature expansion could be regarded as one of the main reasons. This was done to simulate the temperature expansion by only moving the movable wall with different expansion lengths. The different expansion lengths used were 70, 50 and 30 mm. To simulate the variation in temperature during normal operation expansion, first an outward stroke with 30 mm (start-up) and then consecutive inward and outward strokes of 10 mm were used. After only a few cycles of movement the trough was created, and part of the outer edge was empty of rings. This is similar to observations done in burners which have been in operation. Even with only 10 mm repetitive expansion/contractions the pilot test unit was able to recreate the formation of the trough.

Figure 2:
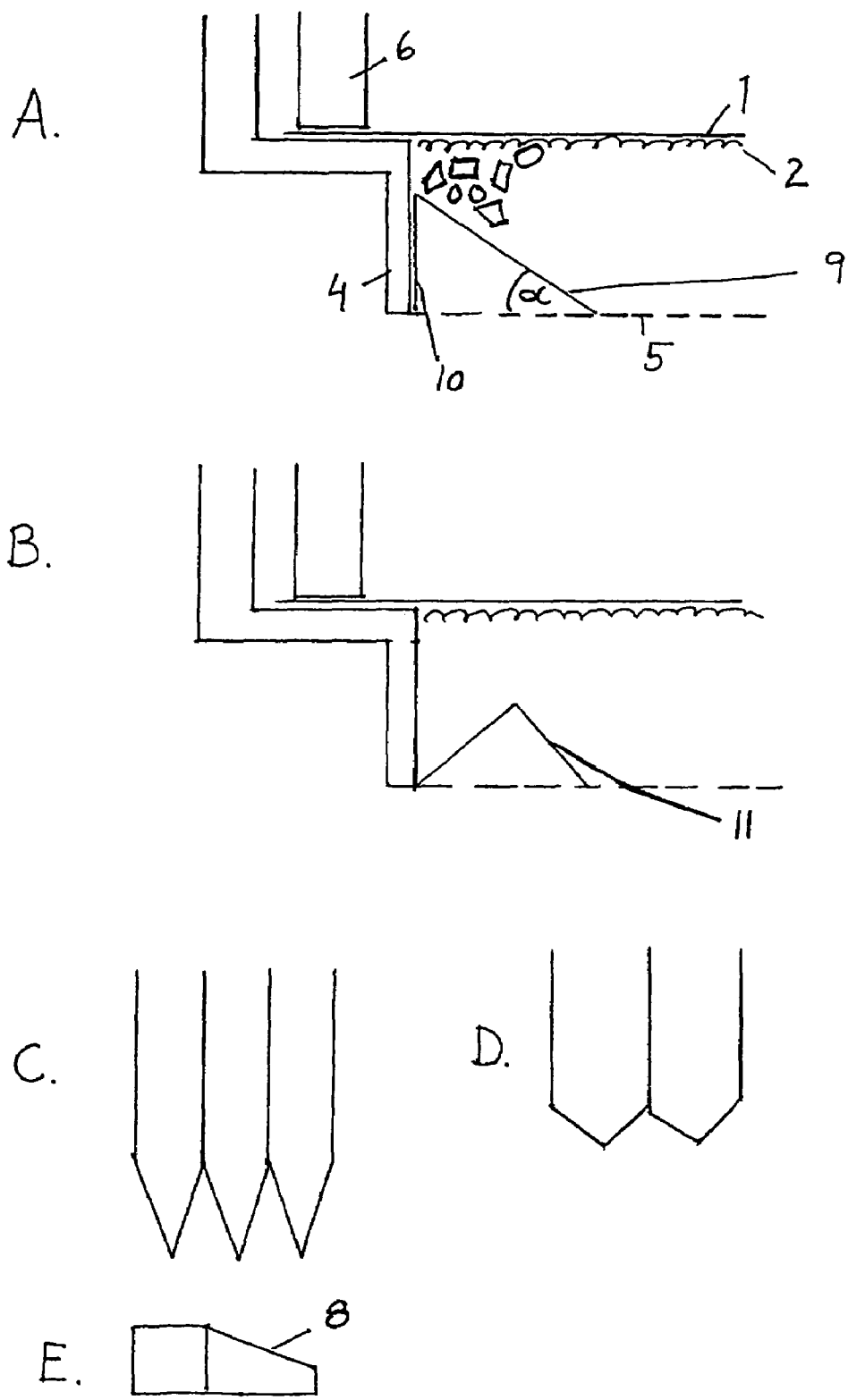
FIG. 2 shows different configurations of the "wave breaker".

Different "wave breakers" were tried out in the pilot plant and these are illustrated in FIG. 2. The tested shapes were a short and long honeycomb structure, a smooth or perforated sheet at different angles and a triangular shaped ridge.

First the short "honeycomb" as shown in FIG. 2D was placed in the bed next to the movable wall without being fastened, and the rings were filled in. The result of an expansion of 30 mm was that the support system started to move inwards and upwards in the bed, at the same time as the trough was created. After 8 cycles the entire support system had risen above the Raschig ring bed, and part of the outer edge was empty of rings. A perforated bottom was welded on to the "honeycomb" support system, and placed in the bed as in the previous experiment. The support system moved somewhat up in the bed, but was stabilized and did not move to the top of the bed. There was however no improvement of the formation of the trough.

A "honeycomb" support system with bottom was then welded to the movable wall. The results of the expansion then was that the trough was created outside of the "honeycomb", but the rings in the chambers did not move at all. The trough was smaller than in the previous experiments, but after 6 cycles the outer edge of the support system became visible in the bed.

Experiments with the long honeycomb structure (FIG. 2C) were also carried out. It was found that the best results were obtained when the support structure was welded to the movable wall and part of the support structure was cut off as shown in FIG. 2E.

The short and long honeycomb support system penetrated the top of the Raschig ring layer in most cases. This can result in sharp edges cutting the gauze, even without the trough formation. When the top of the honeycomb support was cut with a sloping top 8, the performance improved and the support did not penetrate the top of the Raschig rings bed. This system with many small compartments will probably be somewhat more complicated to handle, since all compartments must be filled with rings. If a perforated bottom is mounted in the compartments, they can however be lifted out as complete sections.

Experiments were also carried out with a smooth sheet 9 placed in the bed at two different angels α60 and 75° as illustrated in FIG. 2A. The sheet was welded to the movable wall and three support wedges 10 were welded to the sheet. The smooth sheet installed with an angle of 60° gave the best results with no permanent trough formation. Alternatively it could be a right-angled triangle with the right angled wall fixed to the metal wall. The solution with a sloping sheet is dependent on the roughness of the sheet and the sloping angle. If the angle is reduced, more of the area in the burner is covered. When the sheet is not perforated, the flow area in the burner will be reduced and creating higher pressure drop and uneven flow over the catalyst gauze.

A perforated sheet (5 mm holes) was placed in the bed with different angels, 60°, 45° and 30°. The sheet was welded to the movable wall and three support wedges were welded to the sheet. The results are given in Table 1:

TABLE 1

| α | Expansion length, mm | Number of cycles | Depth of trough, mm | Length*, mm |
|---|---|---|---|---|
| 60 | 30 | 1 | 15 | |
| 60 | 30 | 2 | 35 | 250 |
| 60 | 30 | 5 | 50 | 350 |
| 60 | 30 | 2.5 | 30 | 350[1] |
| 60 | 30 | 3 | 30 | 250 |
| 60 | 30 | 5 | 40 | 400 |
| 60 | 30 | 2.5 | 40 | 350[2] |
| 60 | 30 | 5 | 50 | 350 |
| 45 | 30 | 0.5 | 10 | 200 |
| 45 | 30 | 2.5 | 20 | 300[3] |
| 45 | 30 | 5 | 25 | 300 |
| 45 | 30 | 5.5 | 30 | 350 |
| 45 | 30 | 10 | 30 | 350 |
| 45 | 30 | 14.5 | 35 | 400 |
| 45 | 30 | 15 | 35 | 400 |
| 45 | 30 | 24.5 | 40 | 400 |
| 45 | 30 | 34.5 | 40 | 400 |
| 45 | 30 | 35 | 35 | 350 |
| 30 | 30 | 0.5 | 0 | |
| 30 | 30 | 1 | 0 | |
| 30 | 30 | 1.5 | 20 | [4] |
| 30 | 30 | 2 | 0 | |
| 30 | 30 | 2.5 | 30 | |
| 30 | 30 | 5 | 0 | |
| 30 | 30 | 5.5 | 30 | |
| 30 | 30 | 10 | 20 | [5] |
| 30 | 30 | 10.5 | 35 | |
| 30 | 30 | 15 | 25 | |
| 30 | 30 | 15.5 | 35 | |
| 30 | 30 | 20 | 20 | |

*length from the movable wall to the trough (if the trough is created away from the movable wall).
[1]h = 250
[2]h = 300
[3]The trough is created next to the movable wall
[4]The trough has moved into the bed, about 300 mm.
[5]The trough is permanent With an angle of 60° a trough was created next to the movable wall (50 mm at 5 cycles). Also with 45° a trough was created at the wall, but the size was reduced compared to 60° (35 mm at 35 cycles). By using a sheet with 30° slope the trough moved about 300 mm into the bed and the depth was also reduced (20 mm at 20 cycles).

Experiments were also carried out with a triangular shaped ridge 11 (pyramid shaped support) of perforated sheets (5 mm). It was first placed in the bed without being welded to the movable wall. With this arrangement hardly any improvement in the through formation was observed. If this support is not fastened there is a possibility that the top of the pyramid will penetrate the bed and result in sharp edges that can tear the gauze. When the support was welded to the wall, the support followed the movements and a trough was formed outside the top of the support. This trough was significantly shallower than what was observed without the wave breaker installed. The installation of the triangular shaped ridge that moves with the outer wall or the outer part of the perforated bottom, will move the Raschig rings together with the metal. When the trough is created closer to the centre of the burner basket, the height difference will be smaller.

In the following the results are given for the experiments with a pyramid shaped "wave breaker". A triangular ridge (pyramid shaped) was arranged along the outer wall. The height of the ridge was 100 mm and the angle between the floor and the side was 45°. The edge of the ridge was at the closest approximately 50 mm from the outer wall. The ridge was fixed to the outer wall. The height of Raschig rings was 130 mm-300 mm.

TABLE 2

Results of wall movements with pyramid shaped "wave breaker".

| Test No. | Height of rings (mm) | Wall movement (mm) | Depth of trough (mm) | Width of trough (mm) |
|---|---|---|---|---|
| 1 | 130 | 30 | 35 | 300 |
| 2 | 130 | 30 | 25 | 300 |
| 3 | 130 | 30 | 35 | 300 |
| 4 | 130 | 30/10 | 20 | 300 |
| 5 | 130 | 30/10 | 30 | 300 |
| 6 | 130 | 30/10 | 25 | 300 |
| 7 | 200 | 35 | 20 | 250 |
| 8 | 200 | 30/10 | 25 | 300 |
| 9 | 300 | 30/10 | 25 | 350 |

The trough that is formed is a rather flat depression with no sharp edges or steep falls.

With regard to the trough formation and operation of the burners the solution with the perforated sloping sheets seems to be the best. With an angle of 30° to the horizontal plane the trough was formed away from the wall and the depth was significantly reduced compared to the original. When the trough is formed somewhat away from the wall the tearing forces on the gauze will be reduced. We avoid the concentration of forces due to the gauze weight and the trough formation too close together.

Almost all the wave breakers that were tried gave better results than the use of no support at all. It would also be possible to use for example a sinuosidally shaped metal band fixed to the metal wall. This could be placed just below the steel screen.

In burners which are in operation, expansion occurs over the whole radius. In the pilot test unit the expansion is concentrated at a relatively short distance close to the movable wall, but the test unit recreates the trough as it is seen in operation. Both "wave breakers" in the form of a triangular shaped ridge and a sloping sheet have been tested out in full scale in the factory and the results from the pilot test are confirmed. When a smooth sheet is used, the angle is not of importance as the Raschig rings slide easily on this material. However, when perforated sheets are used the correct angle is important.

The invention claimed is:

1. A support system for catalyst gauzes in an ammonia oxidation burner, comprising:
   ceramic fillings arranged so as to support the catalyst gauzes, the ceramic fillings being contained in a burner basket having metal walls and a perforated bottom plate; and
   a wave breaker arranged in the ceramic fillings so as to be completely covered by the ceramic fillings, the wave breaker being fixed to at least one of an outer periphery of the bottom plate and one of the metal walls.

2. A support system according to claim 1, wherein the wave breaker is filled with at least one of ceramic fillings, Raschig rings, ceramic rings, ceramic catalyst materials and particulate ceramic material, so as to obtain a same flow resistance as the ceramic fillings in the burner basket.

3. A support system according to claim 1, wherein the wave breaker is a triangular shaped ridge.

4. A support system according to claim 3, wherein the ridge is made of segments.

5. A support system according to claim 4, wherein the segments of the ridge have end walls.

6. A support system according to claim 1, wherein the wave breaker is a smooth or perforated sheet arranged at an angle of 10-60° relative to an adjacent one of the walls.

7. A support system according to claim 6, wherein the angle is 25-35°.

8. A support system according to claim 7, wherein the sheet is made of segments.

9. A support system according to claim 8, wherein the segments of the sheet have end walls.

10. A support system according to claim 6, wherein the sheet is made of segments.

11. A support system according to claim 10, wherein the segments of the sheet have end walls.

12. A support system according to claim 1, wherein the wave breaker is a honeycomb structure.

13. A support system according to claim 12, wherein the honeycomb structure has a sloping top.

14. A support system according to claim 1, wherein the ceramic fillings include a ceramic catalyst.

15. A support system according to claim 1, wherein the catalyst gauzes include support screens.

16. A method of reducing movement of ceramic material and avoiding tearing of catalyst gauzes in an ammonia oxidation burner, the method comprising:
   supporting the catalyst gauzes with ceramic fillings contained in a burner basket having metal walls and a perforated bottom plate; and
   arranging a wave breaker in the ceramic fillings so as to be completely covered by the ceramic fillings and fixing the wave breaker to at least one of an outer periphery of the bottom plate and one of the metal walls of the burner basket.

17. The method according to claim 16, wherein the wave breaker is one of a triangular shaped ridge, a smooth sheet, a perforated sheet and a honeycomb structure.

18. The method according to claim 16, wherein the ceramic fillings include a ceramic catalyst.

19. The method according to claim 16, wherein the catalyst gauzes include support screens.

* * * * *